United States Patent
Lau (10) Patent No.: US 8,888,555 B2
(45) Date of Patent: Nov. 18, 2014

(54) METHOD FOR JOINING FABRIC PANELS AND MANUFACTURING BRASSIERES

(75) Inventor: Wai Ching Andy Lau, Hong Kong (HK)

(73) Assignee: Clover Group International Limited, Hong Kong (HK)

( * ) Notice: Subject to any disclaimer, the term of this patent is extended or adjusted under 35 U.S.C. 154(b) by 0 days.

(21) Appl. No.: 13/049,657

(22) Filed: Mar. 16, 2011

(65) Prior Publication Data

US 2011/0171881 A1 Jul. 14, 2011

Related U.S. Application Data

(62) Division of application No. 11/757,624, filed on Jun. 4, 2007, now Pat. No. 7,927,441.

(60) Provisional application No. 60/811,785, filed on Jun. 8, 2006.

(51) Int. Cl.

| | | |
|---|---|---|
| *A41C 3/14* | (2006.01) | |
| *B29C 65/00* | (2006.01) | |
| *A41D 27/24* | (2006.01) | |
| *B29C 65/72* | (2006.01) | |
| *B29C 65/74* | (2006.01) | |
| *B29C 65/08* | (2006.01) | |
| *B29C 65/62* | (2006.01) | |
| *A41C 5/00* | (2006.01) | |
| *A41C 3/10* | (2006.01) | |
| *B29L 31/48* | (2006.01) | |
| *B29K 75/00* | (2006.01) | |
| *B29K 77/00* | (2006.01) | |
| *B29K 105/04* | (2006.01) | |
| *B29K 67/00* | (2006.01) | |
| *B29K 101/12* | (2006.01) | |

(52) U.S. Cl.
CPC ............... *A41C 5/00* (2013.01); *B29C 66/1122* (2013.01); *A41D 27/245* (2013.01); *B29C 65/72* (2013.01); *B29C 65/7435* (2013.01); *B29C 66/729* (2013.01); *A41C 3/144* (2013.01); *B29C 66/43* (2013.01); *B29L 2031/4885* (2013.01); *B29K 2075/00* (2013.01); *B29L 2031/48* (2013.01); *B29K 2077/00* (2013.01); *B29C 65/085* (2013.01); *B29C 65/7443* (2013.01); *B29C 66/232* (2013.01); *B29K 2105/04* (2013.01); *B29K 2067/00* (2013.01); *B29C 65/62* (2013.01); *B29K 2101/12* (2013.01); *B29C 66/83411* (2013.01)
USPC .................................. 450/57; 450/92; 2/267

(58) Field of Classification Search
USPC ............ 450/37, 38, 39, 54–58, 92, 93; 2/267, 2/268
See application file for complete search history.

(56) References Cited

U.S. PATENT DOCUMENTS 4,645,629 A 2/1987 Stern
5,820,443 A 10/1998 Burr (Continued)

FOREIGN PATENT DOCUMENTS

JP 61152431 B3 7/1986
KR 100397755 B2 8/2003

(Continued)

*Primary Examiner* — Gloria Hale
(74) *Attorney, Agent, or Firm* — Muncy, Geissler, Olds & Lowe, P.C.

(57) ABSTRACT

A method of manufacturing a breast cup of a brassiere may include the steps of providing a pad including a first edge portion and a second edge portion, providing a fabric cover including a third edge portion and a fourth edge portion, superimposing the first and third edge portions, connecting the superimposed first and third edge portions together, superimposing the second and fourth edge portions, connecting the superimposed second and fourth edge portions together, ultrasonically cutting and fusing the connected first and third edge portions to form a first line of fusion joining the pad and the fabric cover, ultrasonically cutting and fusing the connected second and fourth edge portions to form a second line of fusion joining the pad and the fabric cover, and turning the joined pad and fabric cover inside out along the first and second lines of fusion to form seamless edges.

17 Claims, 8 Drawing Sheets

(56) References Cited

U.S. PATENT DOCUMENTS

| | | | |
|---|---|---|---|
| 6,796,876 B2 * | 9/2004 | Luk | 450/39 |
| 6,805,610 B2 | 10/2004 | Luk | |
| 6,878,033 B2 * | 4/2005 | Luk | 450/39 |
| 7,166,012 B2 * | 1/2007 | Lau | 450/39 |
| 7,198,540 B2 * | 4/2007 | Liu | 450/39 |
| 8,133,091 B2 * | 3/2012 | Liu | 450/92 |
| 2010/0124869 A1 * | 5/2010 | Liu | 450/39 |

FOREIGN PATENT DOCUMENTS

| | | |
|---|---|---|
| WO | WO 0121019 A1 | 3/2001 |
| WO | WO 03003862 B1 | 1/2003 |

* cited by examiner

METHOD FOR JOINING FABRIC PANELS AND MANUFACTURING BRASSIERES

CROSS REFERENCE TO RELATED APPLICATION

This nonprovisional application is a divisional of U.S. application Ser. No. 11/757,624, filed Jun. 4, 2007 now U.S. Pat. No. 7,927,441 which claims priority to U.S. Provisional Application No. 60/811,785, which was filed on Jun. 8, 2006, and which are all herein incorporated by reference.

BACKGROUND

In the garment industry, it is often necessary to joining fabric panels together by stitching using a sewing machine. For instance, the manufacture of brassieres commonly requires providing breast cups, each of which is usually formed by sewing two fabric panels together along their outer peripheries, where one of the panels will become the outer layer and the other will become the inner layer of the finished breast cup. These two fabric panels require a common seam to produce a desired contour for the cup. By sewing these two fabric panels together along their outer peripheries, a double-layered support cup for a brassiere may be formed. The inner layer is typically in the form of a cup-shaped pad made of a fabric selected for its comfort, whereas the outer layer is decorative and may be made of a fabric having a pleasing outer appearance, such as lace.

However, when the outer peripheries of the two fabric panels are sewed together, bulky and prominent seam allowances are formed along the outer peripheries. These bulky and prominent seam allowances of the breast cups can be uncomfortable and aesthetically undesirable. Hence, it is desirable to produce garment articles that are comfortable and aesthetically desirable.

U.S. Pat. No. 6,805,610 discloses a brassiere that incorporates seamless breast cups featuring a negligible amount of stitching joining various sections of the brassiere together. This patent also discloses a method of manufacturing a brassiere featuring the steps of laminating a first sheet of molded foam material and a second coextensive sheet of foam material directly to each other, and affixing two molded flexible breast cups to a chest band core. However, different molds are necessary to manufacture breast cups of different shapes. This substantially increases the manufacturing costs. Therefore, there is a need to provide an improved method for manufacturing a breast cup of a brassiere that offers reduced cost and simplicity, as well as flexibility.

SUMMARY

According to one aspect of the present invention, there is provided a method of joining fabric panels to manufacture an article of apparel, which may include the steps of providing a first fabric panel and a second fabric panel, overlapping said first and second fabric panels to form a superimposed peripheral portion, connecting said first and second fabric panels together at said superimposed peripheral portion, ultrasonically cutting and fusing the connected first and second fabric panels at said superimposed peripheral portion to form a line of fusion joining said first and second fabric panels, and turning said joined first and second fabric panels inside and out along said line of fusion to form a seamless edge.

According to another aspect of the present invention, there is provided a method of manufacturing a breast cup of a brassiere, which may include the steps of providing a pad including a first edge portion and a second edge portion, providing a fabric cover including a third edge portion and a fourth edge portion, superimposing said first and third edge portions, connecting said superimposed first and third edge portions together, superimposing said second and fourth edge portions, connecting said superimposed second and fourth edge portions together, ultrasonically cutting and fusing said connected first and third edge portions to form a first line of fusion joining said pad and said fabric cover, ultrasonically cutting and fusing said connected second and fourth edge portions to form a second line of fusion joining said pad and said fabric cover, and turning said joined pad and fabric cover inside out along said first and second lines of fusion to form seamless edges.

According to a further aspect of the present invention, there is provided a breast cup that includes a pad and a fabric cover attached to the pad with seamless edges.

According to a further aspect of the present invention, there is provided a brassiere that includes two of the breast cups affixed to each other, to a back band, and to shoulder straps.

DETAILED DESCRIPTION

Reference will now be made in detail to a particular embodiment of the invention, examples of which are also provided in the following description. Exemplary embodiments of the invention are described in detail, although it will be apparent to those skilled in the relevant art that some features that are not particularly important to an understanding of the invention may not be shown for the sake of clarity.

Furthermore, it should be understood that the invention is not limited to the precise embodiments described below and that various changes and modifications thereof may be effected by one skilled in the art without departing from the spirit or scope of the invention. For example, elements and/or features of different illustrative embodiments may be combined with each other and/or substituted for each other within the scope of this disclosure and appended claims. In addition, improvements and modifications which may become apparent to persons of ordinary skill in the art after reading this disclosure, the drawings, and the appended claims are deemed within the spirit and scope of the present invention.

A method of joining two fabric panels for the manufacture of an article of apparel may include the steps of providing a first fabric panel 20 and a second fabric panel 22, overlapping the first 20 and second 22 fabric panels to form a superimposed peripheral portion, connecting the first and second fabric panels together at the superimposed peripheral portion, ultrasonically cutting and fusing the connected peripheral portions 20a and 22a to form a line of fusion 34 joining the first 20 and second 22 fabric panels, and turning the joined first 20 and second 22 fabric panels inside and out along the line of fusion 34 to form a seamless edge 36, as depicted in FIGS. 1 to 7.

As used herein the term "seam" means a line of junction formed by sewing together fabric panels along their margins. The term "seam allowance" means the portion of fabric between the fabric edge and the adjacent line of stitching.

As used herein the term "line of stitching" or "stitch line" means the line formed when fabric panels are joined together by stitches. The term "line of fusion" or "fusion line" means the line formed when fabric panels are joined together by fusion, which is a procedure of joining layers of fabric together by softening or melting the thermoplastic material of the fabric layers by heat and subsequently solidifying when the application of heat is removed.

Figure 1:
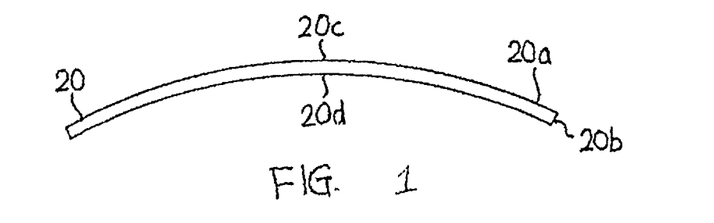
FIG. 1 is a cross-sectional view depicting the first step of joining two fabric panels together to manufacture an article of appeal.
Figure 2:
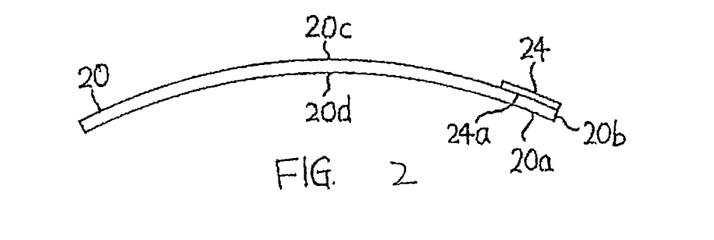
FIG. 2 is a cross-sectional view depicting the second step of joining two fabric panels together to manufacture an article of appeal.
Figure 3:
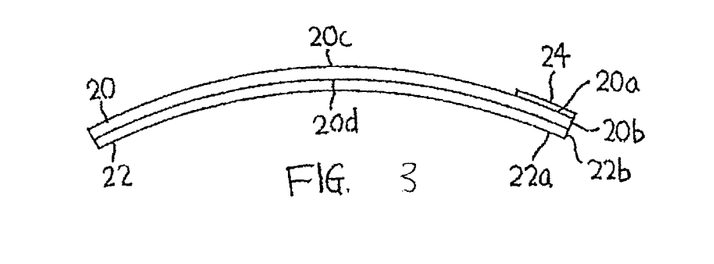
FIG. 3 is a cross-sectional view depicting the third step of joining two fabric panels together to manufacture an article of appeal.

The first step includes providing a first fabric panel 20 and a second fabric panel 22 each having a peripheral portion 20a and 22a, as depicted in FIGS. 1 to 4. The first fabric panel 20 may have a peripheral portion 20a, a peripheral edge 20b, a first side 20c and an opposing second side 20d, as depicted in FIG. 1. The second fabric panel 22 may have a peripheral portion 22a and a peripheral edge 22b, as depicted in FIG. 3. The fabric panels 20 and 22 independently may be made of elastic and/or thermoplastic materials such as nylon, polyester, spandex, LYCRA®, foam, or combinations thereof. For example, a fabric panel can be made of about 50% polyurethane (foam), about 46% nylon (first outer fabric), and about 4% spandex (second outer fabric).

The first step optionally may include providing a stabilizing strip 24 and fixedly attaching the stabilizing strip 24 along the peripheral portion 20a of the fabric panel 20 on the first side 20c, as depicted in FIG. 2. The stabilizing strip 24 may be adhered to the peripheral portion 20a by applying heat and/or pressure to a thin thermal adhesive film provided on the underside 24a of the stabilizing strip 24. The stabilizing strip 24 may be made of a substantially inelastic material and may have a width of about 10 mm. For example, the stabilizing strip 24 may be made of 100% nylon. For example, the thermal adhesive film may be made of polyurethane. The stabilizing strip 24 may be used to stabilize the peripheral portion 20a of the fabric panel 20, which may be otherwise stretchable and easily deformable.

The second step includes overlapping the first 20 and second 22 fabric panels and forming a superimposed peripheral portion, as depicted in FIG. 3. The first 20 and second 22 fabric panels may be placed in an overlapping position such that the peripheral portions 20a and 22a are in a superimposed position and the peripheral edges 20b and 22b are aligned. Sheet materials of any nature may be sandwiched between the fabric panels. For example, sheet materials may include a thermoplastic material.

Figure 4:
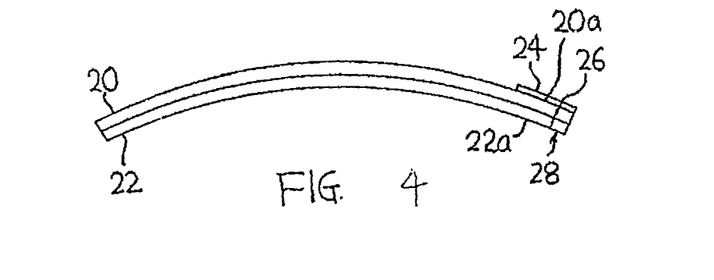
FIG. 4 is a cross-sectional view depicting the fourth step of joining two fabric panels together to manufacture an article of appeal.

The third step includes connecting the panels at the superimposed peripheral portion, for example, by stitching the superimposed peripheral portion to form a line of stitching 26, as depicted in FIG. 4. The peripheral portions 20a and 22a and the stabilizing strip 24 may be stitched together by a single stitching to form a seam or stitch line 26 and seam allowances 28. The stitch line 26 may be formed about 2 to about 4 mm from the peripheral edges 20b and 22b. The stitching step is configured to prevent lateral movement of the fabrics relative to each other. Methods other than stitching known to people with ordinary skill in the art may also be satisfactorily used for the purpose of preventing the lateral movement of the fabric layers. Any sewing machine may be used to carry out the stitching; however, other equipment generally known to one of ordinary skill in the art may also be used.

Figure 5:
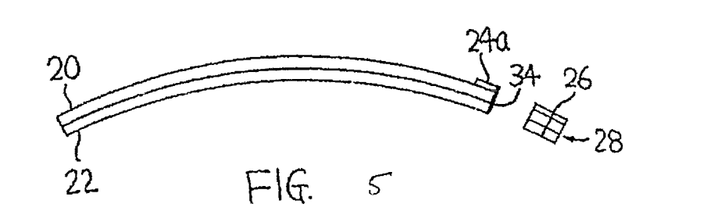
FIG. 5 is a cross-sectional view depicting the fifth step of joining two fabric panels together to manufacture an article of appeal.

The fourth step includes ultrasonically cutting and fusing the connected peripheral portions 20a and 22a, for example, by ultrasonically cutting and fusing the stitched peripheral portions 20a and 22a to remove the line of stitching 26, and to form a line of fusion 34 joining the first 20 and second 22 fabric panels, as depicted in FIG. 5. The ultrasonically cutting and fusing may be conducted along a line that is generally parallel to and spaced apart inwardly from the stitch line 26. The line of fusion 34, having a width of less than about 1 mm, may be formed about 4 to 7 mm from the peripheral edges 20b and 22b. The fused marginal edge so formed may be substantially flat and smooth.

Figure 6:
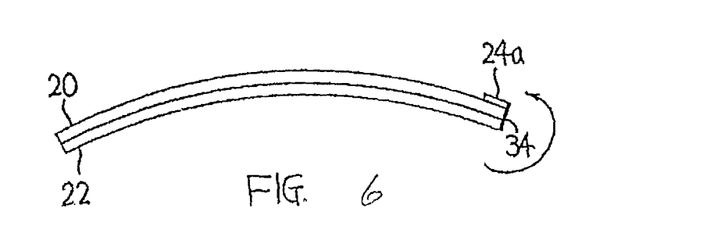
FIG. 6 is a cross-sectional view depicting the sixth step of joining two fabric panels together to manufacture an article of appeal.
Figure 7:
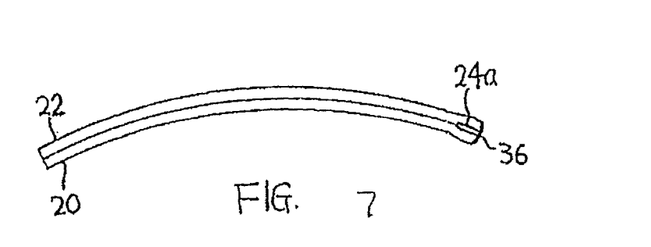
FIG. 7 is a cross-sectional view depicting the seventh step of joining two fabric panels together to manufacture an article of appeal.

The fifth step includes turning the joined first 20 and second 22 fabric panels inside out along the line of fusion 34 to form a seamless edge, as indicated by the arrow and depicted in FIGS. 6 and 7. The turning of joined first 20 and second 22 fabric panels inside out along the line of fusion to form a seamless edge is a process referred to as being "bagged out" or "bagging out."

The two fabric panels 20 and 22 being joined by the line of fusion 34 are depicted in FIG. 7. By turning the two fabric panels 20 and 22 inside out, rough outer fusion surfaces may be hidden between the two fabric panels 20 and 22 to expose only smooth inner surfaces of the two fabric panels 20 and 22 and to form the seamless edge 36. No prominent edge may be formed along the peripheral portions of the fabric panels 20 and 22. It is noted that the actual thickness of the stabilizing strip 24a is minimal; the remaining stabilizing strip 24a disposed between the two fabric panels 20 and 22 as shown in FIG. 7 was exaggerated for illustration purposes only.

Figure 8:
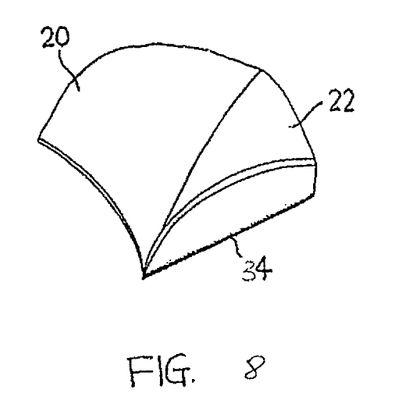
FIG. 8 depicts a partial perspective view of two fabric panels being joined together by ultrasonic cutting and fusion.
Figure 9:
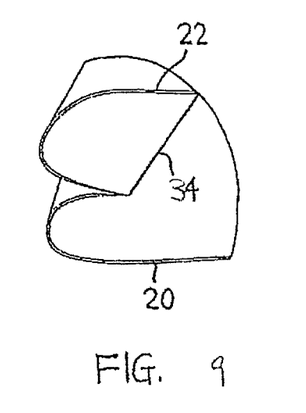
FIG. 9 depicts a partial perspective view of the panels of FIG. 8 being turned inside out along a line of fusion.

A partial perspective view of two fabric panels 20 and 22 being joined together along the line of fusion 34 by ultrasonic cutting and fusing process is depicted in FIG. 8. A partial perspective view of the two fabric panels 20 and 22 of FIG. 8 being turned inside out along the line of fusion 34 is depicted in FIG. 9. It can be seen that there is no stitch line or seam allowance along the marginal edge portion of the two joined fabric panels 20 and 22. The line of fusion 34 is substantially invisible after turning the two fabric panels 20 and 22 inside out.

The same steps described above in connection with joining two layers of fabrics is applicable to processes involving joining a plurality of fabric panels, where the fabric panels may be divided into two groups for turning inside out or being bagged out. The method offers simplicity as well as flexibility because it is not limited to the size or the number of the fabric panels.

A method of manufacturing a breast cup of a brassiere may include the steps of providing a cup-shaped pad 50 having a first side 52, an opposing second side 54, a first edge portion 56, and a second edge portion 58; providing a fabric cover 70 having a third edge portion 72 and a fourth edge portion 74; placing the fabric cover 70 on the second side 54 of the pad; superimposing the first 56 and third 72 edge portions; stitching the superimposed first 56 and third 72 edge portions together to form a first line of stitching 76; superimposing the second 58 and fourth 74 edge portions; stitching the superimposed second 58 and fourth 74 edge portions together to form a second line of stitching 78; ultrasonically cutting and fusing the stitched first 56 and third 72 edge portions together to remove the first line of stitching 76 and to form a first line of fusion 90 joining the pad 50 and the fabric cover 70; ultrasonically cutting and fusing the stitched second 58 and fourth 74 edge portions together to remove the second line of stitching 78 and to form a second line of fusion 92 joining the pad 50 and the fabric cover 70; and turning the joined pad 50 and fabric cover 70 inside out along the first 90 and second 92 lines of fusion to form seamless edges 190 and 192, as depicted in FIGS. 10 to 16. The ultrasonically cutting and fusing may be along the line that is generally parallel to and spaced apart inwardly from the first line of stitching 76 and along a line that is generally parallel to and spaced apart inwardly from the second line of stitching 78.

Figure 10:
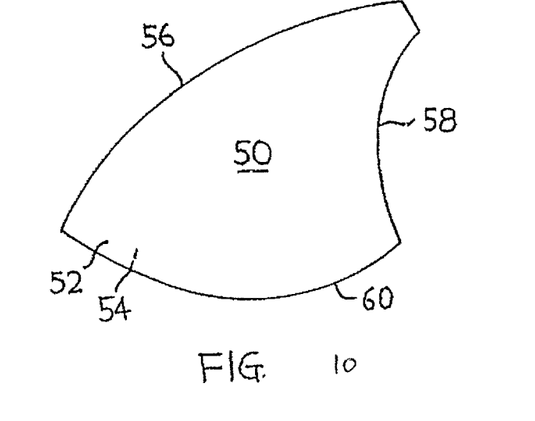
FIG. 10 is a front view depicting the first step of manufacturing a breast cup of a brassiere.

The first step includes providing a cup-shaped pad 50 having a first side 52, an opposing second side 54, a first edge portion 56, and a second edge portion 58, as depicted in FIG. 10. The first side 52 may be a front or convex side 52. The second side 54 may be a rear or concave side. The first edge portion 56 may be a neckline edge portion. The second edge portion 58 may be an underarm edge portion. The pad 50 may also have a bottom edge portion 60. The pad 50 may be made of elastic and/or thermoplastic materials such as nylon, polyester, spandex, LYCRA®, foam, or combinations thereof. For example, the pad 50 can be made of about 50% polyurethane (foam), about 46% nylon (first outer fabric), and about 4% spandex (second outer fabric).

Figure 11:
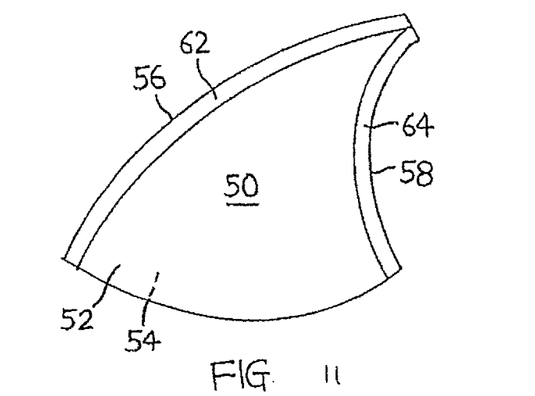
FIG. 11 is a front view depicting the second step of manufacturing a breast cup of a brassiere.

The first step optionally may include providing two stabilizing strips 62 and 64, fixedly attaching the first stabilizing strip 62 along the edge portion 56 on the convex side of the pad 52, and fixedly attaching the second stabilizing strip 64 along the edge portion 58 on the convex side of the pad 52, as depicted in FIG. 11. The stabilizing strips 62 and 64 may be adhered to the edge portions 56 and 58, respectively, by applying heat and/or pressure to a thin thermal adhesive film provided on the underside of each of the stabilizing strips 62 and 64. The thermal adhesive film may be made of polyurethane.

The stabilizing strips 62 and 64 may have a width of about 10 mm and a length substantially the same as the length of the edge portions 56 and 58. The stabilizing strips 62 and 64 independently may be made of a substantially inelastic material such as 100% nylon. The stabilizing strips 62 and 64 are configured to stabilize the first edge portion 56 and the second edge portion 58 of the pad 50 that may be otherwise stretchable and deformable.

Figure 12:
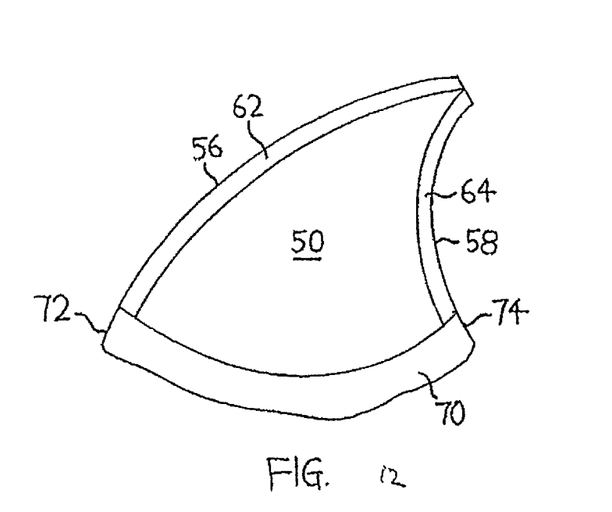
FIG. 12 is a front view depicting the third step of manufacturing a breast cup of a brassiere.

The second step includes providing a fabric cover 70 having a third edge portion 72 and a fourth edge portion 74, as depicted in FIG. 12.

Figure 13:
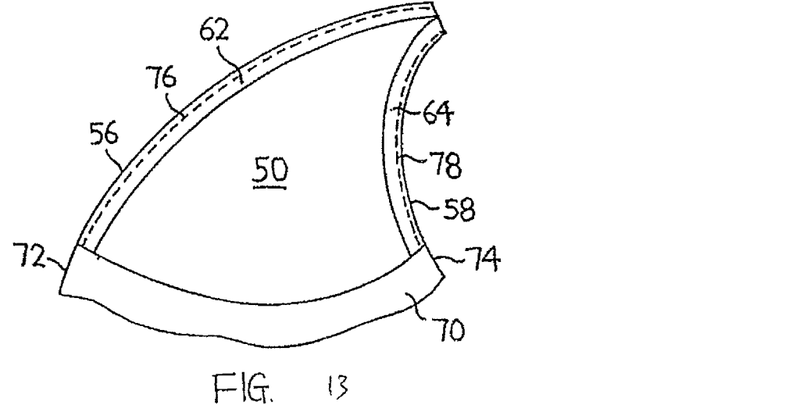
FIG. 13 is a front view depicting the fourth step of manufacturing a breast cup of a brassiere.

The third step includes placing the fabric cover 70 on the second side 54 of the pad; superimposing the first 56 and third 72 edge portions; and connecting the superimposed first 56 and third 72 edge portions together, for example, by stitching the superimposed first 56 and third 72 edge portions together to form a first line of stitching 76, as depicted in FIG. 13. The pad 50 and the fabric cover 70 may be placed in an overlapping relationship such that the edge portion 56 of the pad 50 and the edge portion 72 of the fabric cover 70 are superimposed. The fabric cover 70 may be made of elastic and/or thermoplastic materials such as nylon, polyester, LYCRA®, spandex, or combinations thereof. For example, the fabric cover 70 can be made of about 72% nylon and about 28% LYCRA®. The edge portions 56 and 72 and the optional stabilizing strip 62 may be stitched together by a single stitching to form a first stitch line 76.

The fourth step includes superimposing the second 58 and fourth 74 edge portions; and connecting the superimposed second 58 and fourth 74 edge portions together, for example, by the stitching the superimposed second 58 and fourth 74 edge portions together to form a second line of stitching 78, as depicted in FIG. 13. The pad 50 and the fabric cover 70 may be placed in an overlapping relationship such that the edge portion 58 of the pad 50 and the edge portion 74 of the fabric cover 70 are superimposed. The edge portions 58 and 74 and the optional stabilizing strip 64 may be stitched together by a single stitching to form a second stitch line 78. The stitch lines 76 and 78 may be formed about 2 to 4 mm from the peripheral edges of the edge portions 56 and 58, respectively. Any sewing machine may be used to carry out the stitching; however, other equipment generally known to one of ordinary skill in the art may also be used.

Figure 14:
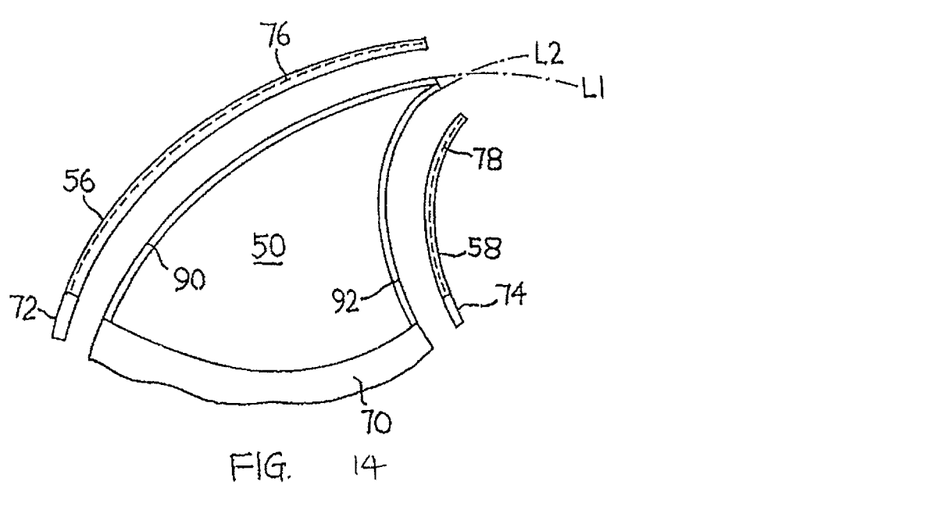
FIG. 14 is a front view depicting the fifth step of manufacturing a breast cup of a brassiere.

The fifth step includes ultrasonically cutting and fusing the connected first 56 and third 72 edge portions, for example, by ultrasonically cutting and fusing the connected first 56 and third 72 edge portions together to remove the first line of stitching 76, and to form a first line of fusion 90 joining the pad 50 and the fabric cover 70, as depicted in FIG. 14. If optional stabilizing strip 62 is present, the first line of fusion joins the pad, the fabric cover, and the stabilizing strip. The ultrasonically cutting and fusing may be performed along a line L1 that is generally parallel to and spaced apart inwardly from the stitch line 76.

The sixth step includes ultrasonically cutting and fusing the connected second 58 and fourth 74 edge portions, for example, by ultrasonically cutting and fusing the connected second 58 and fourth 74 edge portions together to remove the second line of stitching 78, and to form a second line of fusion 92 joining the pad 50 and the fabric cover 70, as depicted in FIG. 14. If optional stabilizing strip 64 is present, the second line of fusion 92 joins the pad 50, the fabric cover 70, and the stabilizing strip 64. The ultrasonically cutting and fusing may be performed along a line L2 that is generally parallel to and spaced apart inwardly from the stitch line 78. The lines of fusion 90 and 92 may have a width of less than about 1 mm, and may be formed about 4 to 7 mm from the peripheral edges of the edge portions 56 and 58, respectively.

Figure 15:
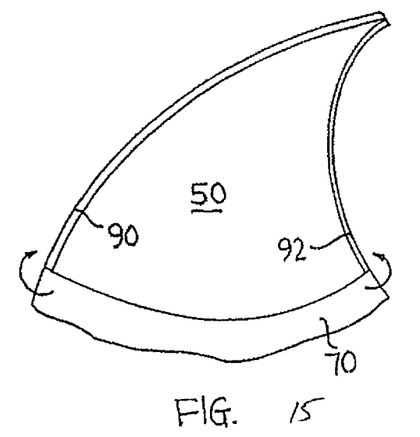
FIG. 15 is a front view depicting the sixth step of manufacturing a breast cup of a brassiere.
Figure 16:
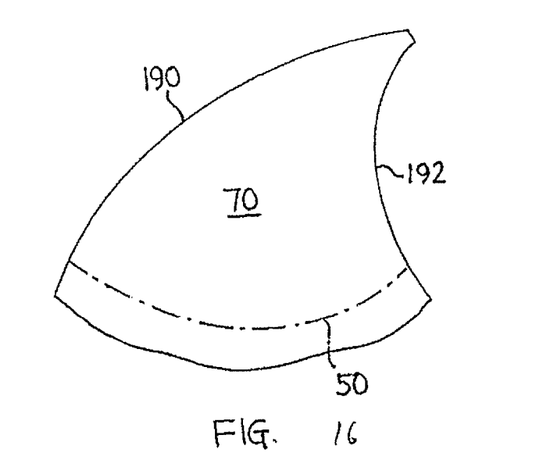
FIG. 16 is a front view depicting the seventh step of manufacturing a breast cup of a brassiere.

The seventh step includes turning the joined pad 50 and fabric cover 70 inside out along the first 90 and second 92 lines of fusion to form seamless edges 190 and 192, as indicated by the arrows and depicted in FIGS. 15 and 16.

Figure 17:
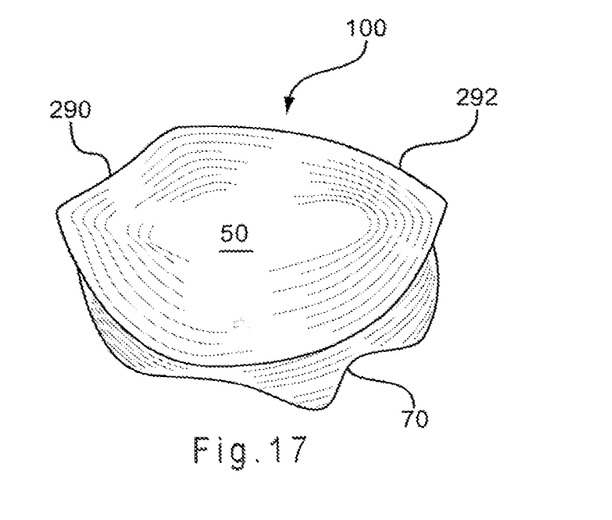
FIG. 17 depicts a breast cup of a brassiere formed by the method of FIGS. 10 to 16.

According to a further aspect of the present invention, there is provided a brassiere containing a breast cup 100, as depicted in FIG. 17. The breast cup 100 includes the pad 50 and the fabric cover 70 with seamless edges 290 and 292. The pad 50 may include an inner breast-receiving layer and is preferably made of fabric selected for its comfort to a woman wearing the brassiere, such as a thermoplastic material. The fabric cover 70 may include an outer layer of the breast cup and may be made of a fabric that offers a pleasing color and outer appearance, such as elastic and/or thermoplastic material. Two breast cups 100 may be affixed to each other, to a back band and to shoulder straps to form a brassiere.

Figure 18:
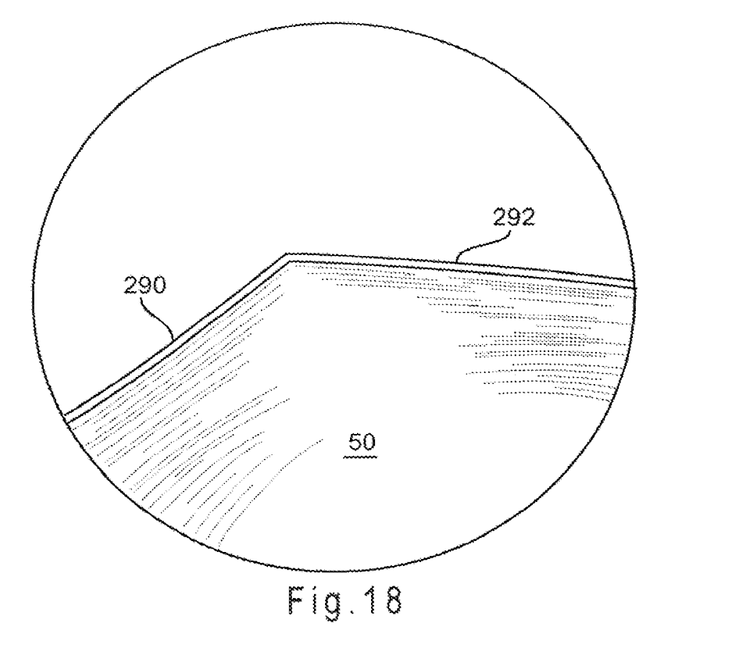
FIG. 18 depicts an enlarged view showing a marginal edge of the breast cup of FIG. 17.

An enlarged view of the fused edge of the breast cup 100 of FIG. 17 is depicted in FIG. 18. The breast cup 100 may have fused edges 290 and 292 of less than about 1 mm in width. The breast cup 100 is free of bulky and prominent seam allowances or stitch lines. This substantially improves the overall appearance and comfort of a brassiere containing the breast cup 100.

Figure 19:
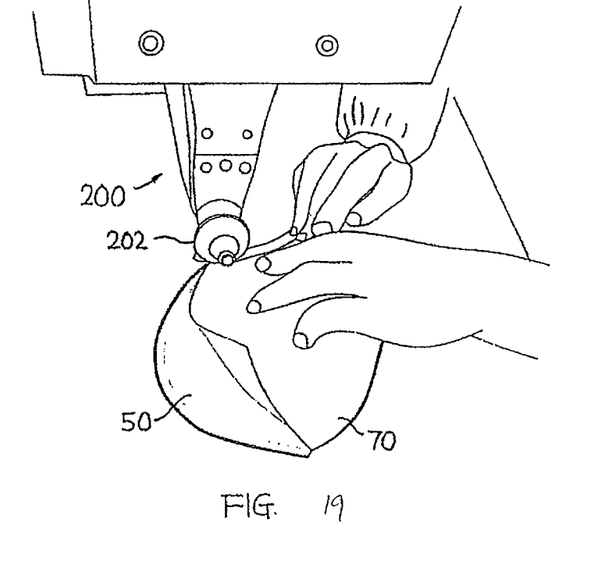
FIG. 19 depicts an image of a breast cup being form from an ultrasonic cutting and fusing machine.
Figure 20:
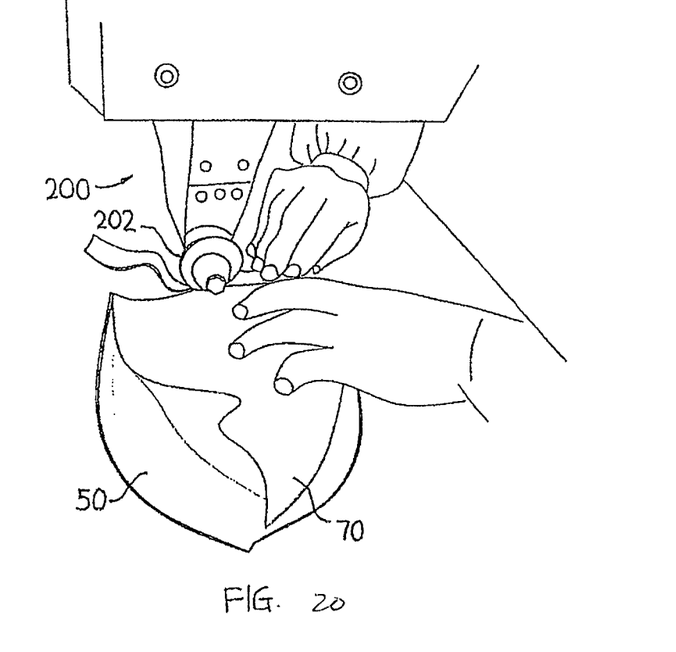
FIG. 20 depicts another image of applying ultrasonic cutting and fusion to produce a breast cup using an ultrasonic cutting and fusing machine.

An ultrasonic cutting and fusing machine 200 for conducting ultrasonic cutting and fusing is depicted in FIGS. 19 and 20, available under Model No. GC-50S manufactured from Golden Casting Company (Hong Kong, CN). The ultrasonic cutting and fusing machine 200 has an ultrasonic cutting and fusing blade 202 adapted for simultaneously cutting and fusing layers of fabric by the dissipation of ultrasonic energy. In order to ultrasonically fuse layers of fabric together, the fabric layers may contain a significant amount of thermoplastic material. The thermoplastic material, under the influence of ultrasonic energy, may soften or melt and subsequently solidify when no longer subjected to ultrasonic energy, thus leaving a fused surface in a narrow marginal edge adjacent to the cut. The fused surfaces may be rough. Because the marginal edge produced by such ultrasonic fusing may be narrow, if not negligible, by turning the fabric layers inside out, the rough outer fusion surfaces may be hidden between the fabric layers, thereby exposing only the smooth inner surfaces and forming a seamless edge.

Two layers of fabric may be joined together by ultrasonically cutting and stamping the peripheral edge portions of the fabric layers using an ultrasonic stamp-cutting machine. An example of an ultrasonic stamp-cutting machine is Model No. SUW 4215 manufactured by K. Sonic (Shanghai, CN). In another embodiment, the ultrasonic stamp-cutting machine may be employed to join fabric panels together by ultrasonically stamping the peripheral edge portions of the fabric panels and simultaneously removing the peripheral edges by cutting.

The ultrasonic stamp-cutting machine may have an ultrasonic cutting and stamping blade adapted for simultaneously cutting and stamping the layers of fabric, thereby removing raw edges and forming lines of fusion. Turning the layers of fabric inside out along the lines of fusion may then form seamless edges. Although it has been shown that an ultrasonic cutting and fusing machine may be employed to join two layers of fabric together, it is appreciated that other suitable machines may be employed.

While the examples of the methods and products have been described, it should be understood that the methods and products are not so limited, and modifications may be made. The scope of the method and products is defined by the appended claims, and all methods and products that come within the meaning of the claims, either literally or by equivalence, are intended to be embraced therein.

What is claimed is:

1. A breast cup, comprising:
   a cup-shaped pad;
   a fabric cover, and
   a stitchless edge,
   wherein said stitchless edge comprises a line of fusion along an edge of said pad where said edge of said pad is fused to an edge of said fabric cover, and
   wherein said line of fusion includes a stabilizing strip attached to said pad by an adhesive film provided on one side of said stabilizing strip, said edge of said pad being positioned between said stabilizing strip and said edge of said fabric cover when said edge of said pad is fused to an edge of said fabric cover.

2. The breast cup of claim 1, wherein said pad has an inner breast-receiving surface.

3. The breast cup of claim 2, wherein said inner breast-receiving surface comprises a thermoplastic material.

4. The breast cup of claim 1, wherein said pad is made of a material selected from the group consisting of nylon, polyester, spandex, foam and combinations thereof.

5. The breast cup of claim 1, wherein said fabric cover comprises an elastic material that includes nylon, polyester, spandex and combinations thereof.

6. The breast cup of claim 1, wherein said stabilizing strip is made of nylon.

7. A brassiere, comprising:
   two of the breast cups of claim 1, wherein each of the two breast cups are affixed to each other,
   a back band, wherein each of the two breast cups are affixed to the back band, and
   two shoulder straps, wherein each of the two breast cups are affixed to a respective one of the two shoulder straps.

8. A breast cup, comprising:
   a cup-shaped pad;
   a fabric cover attached to said pad along a line of fusion, the line of fusion provided along an edge of said pad where said edge of said pad is fused to an edge of said fabric cover;
   wherein the fabric cover attached to the pad is turned inside out along the line of fusion to form a breast cup,
   wherein said line of fusion includes a stabilizing strip attached to said pad by an adhesive film provided on one side of said stabilizing strip, said edge of said pad being positioned between said stabilizing strip and said edge of said fabric cover when said edge of said pad is fused to said edge of said fabric cover.

9. The breast cup of claim 8, wherein said pad has an inner breast-receiving layer.

10. The breast cup of claim 9, wherein said inner breast-receiving layer is made from a thermoplastic material.

11. The breast cup of claim 8, wherein said pad is made of a material selected from the group consisting of nylon, polyester, spandex, foam and combinations thereof.

12. The breast cup of claim 8, wherein said fabric cover comprises a material selected from the group consisting of nylon, polyester, spandex and combinations thereof.

13. The breast cup of claim 8, wherein said stabilizing strip is made of nylon.

14. A brassiere, comprising:
   two of the breast cups of claim 8, wherein each of the two breast cups are affixed to each other,
   a back band, wherein each of the two breast cups are affixed to the back band, and two shoulder straps, wherein each of the two breast cups are affixed to a respective one of the two shoulder straps.

15. The breast cup of claim 1, wherein said stitchless edge comprises a stitchless connection of said pad to said fabric cover.

16. The breast cup of claim 15, wherein said stitchless edge comprises an edge formed by turning the fabric cover attached to the pad inside out along the line of fusion.

17. A breast cup of a brassiere formed by a method comprising the steps of:
  providing a cup-shaped first fabric panel and a second fabric panel;
  overlapping said first and second fabric panels to form a superimposed peripheral portion;
  connecting said first and second fabric panels together by stitching the first and second fabric panels together to form a line of stitching at said superimposed peripheral portion;
  ultrasonically cutting and thereby fusing the connected first and second fabric panels at said superimposed peripheral portion to form a line of fusion joining said first and second fabric panels and thereby removing the line of stitching; and
  turning said joined first and second fabric panels inside out along said line of fusion to form a breast cup,
  wherein said line of fusion includes a stabilizing strip attached to said first fabric panel by an adhesive film provided on one side of said stabilizing strip, said first fabric panel being positioned between said stabilizing strip and said second fabric panel when said superimposed peripheral portion of the connected first and second fabric panels are fused.

* * * * *